US011091949B2

(12) United States Patent
Salter et al.

(10) Patent No.: US 11,091,949 B2
(45) Date of Patent: Aug. 17, 2021

(54) LIFTGATE OPENING HEIGHT CONTROL

(71) Applicant: FORD GLOBAL TECHNOLOGIES, LLC, Dearborn, MI (US)

(72) Inventors: Stuart C. Salter, White Lake, MI (US); David Brian Glickman, Southfield, MI (US); Paul K. Dellock, Northville, MI (US); Zeljko Deljevic, Plymouth, MI (US); Aaron M. Halonen, Brighton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 239 days.

(21) Appl. No.: 16/274,413

(22) Filed: Feb. 13, 2019

(65) Prior Publication Data

US 2020/0256113 A1 Aug. 13, 2020

(51) Int. Cl.
*B60J 5/10* (2006.01)
*E05F 15/73* (2015.01)
*E05F 15/40* (2015.01)

(52) U.S. Cl.
CPC .............. *E05F 15/73* (2015.01); *B60J 5/101* (2013.01); *E05F 15/40* (2015.01); *E05Y 2400/354* (2013.01); *E05Y 2900/546* (2013.01)

(58) Field of Classification Search
CPC . B60J 5/101; E05F 15/73; E05F 15/40; E05Y 2400/354; E05Y 2900/546
USPC ............................................ 296/146.4, 146.8
See application file for complete search history.

(56) References Cited

U.S. PATENT DOCUMENTS

| 5,739,523 | A | * | 4/1998 | Tsutsumi | ................ | E05F 15/73 |
| | | | | | | 250/221 |
| 7,547,058 | B2 | | 6/2009 | King et al. | | |
| 9,470,034 | B2 | | 10/2016 | Ihlenburg et al. | | |
| 2009/0174658 | A1 | * | 7/2009 | Blatchley | .............. | G06F 1/1601 |
| | | | | | | 345/158 |
| 2013/0302760 | A1 | * | 11/2013 | Welles | ................... | G09B 9/052 |
| | | | | | | 434/69 |

(Continued)

FOREIGN PATENT DOCUMENTS

| CN | 106481187 A | 3/2017 |
| CN | 206337967 U | 7/2017 |

(Continued)

*Primary Examiner* — Joseph D. Pape
(74) *Attorney, Agent, or Firm* — David Coppiellie; MacMillan, Sobanski & Todd, LLC

(57) ABSTRACT

A vehicle includes a liftgate system with a vertically-opening liftgate and a power actuator responsive to a user opening command for opening the liftgate to a variable opening height. The vehicle has an active sensor adapted to detect objects and their respective distances within a detection zone and a camera adapted to capture a search image with a field-of-view showing objects in the detection zone. In response to the user opening command, a controller 1) performs facial recognition on the search image to detect image locations containing a face of each respective person visible in the search image, 2) identifies distances for each respective person according to coincidence with the detected objects, 3) determines a user height according to the respective image location and distance of at least one respective person visible in the search image, and 4) sets the variable opening height in response to the user height.

18 Claims, 5 Drawing Sheets

(56) References Cited

U.S. PATENT DOCUMENTS

2018/0111455 A1    4/2018  Frias
2019/0323278 A1*  10/2019  Ghannam ............... E05F 15/42

FOREIGN PATENT DOCUMENTS

CN         107117118 A    9/2017
KR       20150141444 A   12/2015

* cited by examiner

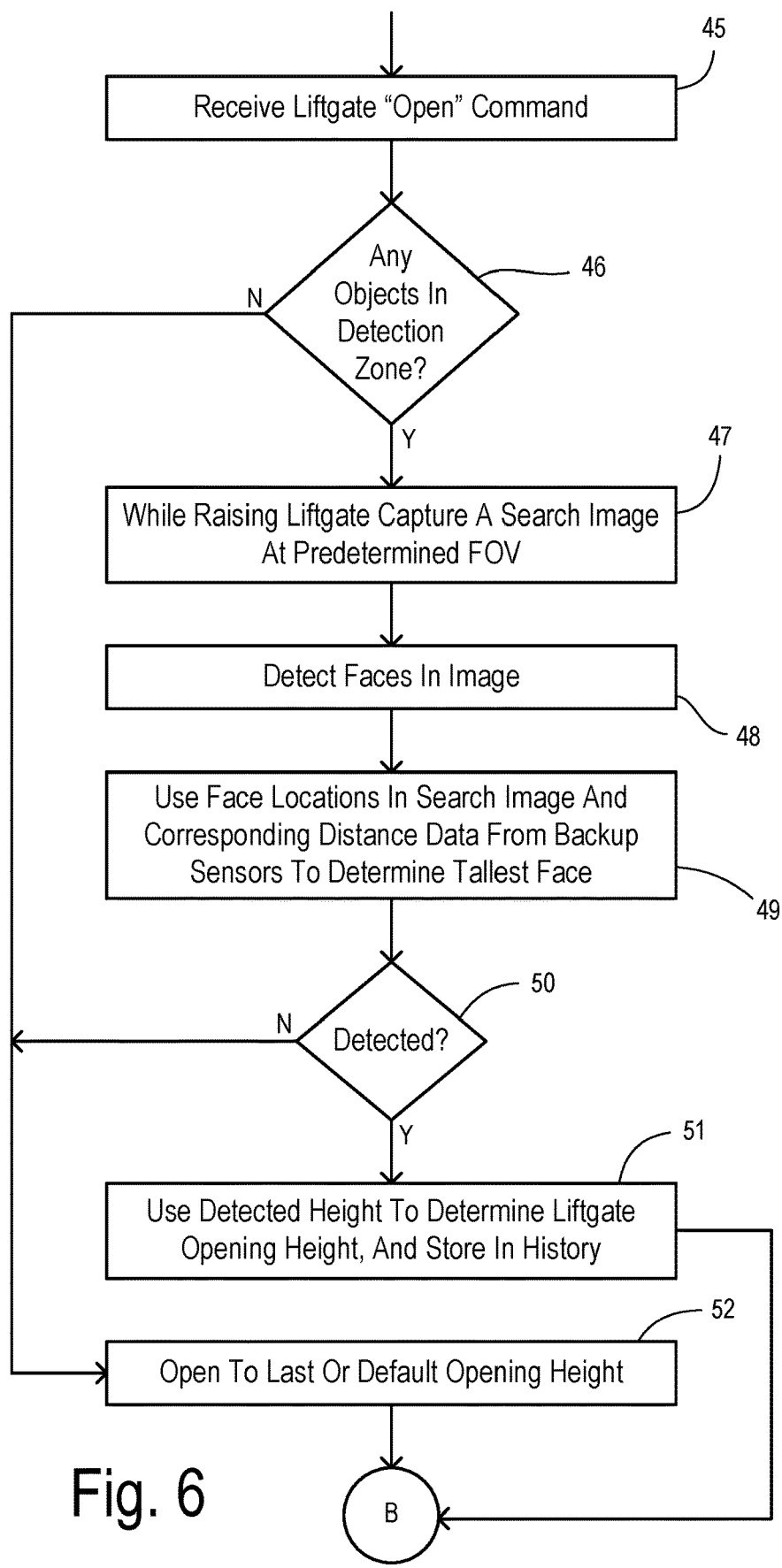

LIFTGATE OPENING HEIGHT CONTROL

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive vehicles having powered door actuators, and, more specifically, to automatic control of the opening height of a powered liftgate according to the height of a user.

Some automotive vehicle employ vertically-opening cargo doors, such as a rear hatchback of a sport utility vehicle, a rear trunk of a sedan, or a front hood or trunk (i.e., frunk) of an electrified vehicle (all of which are collectively referred to herein as a liftgate). Many liftgates may be included in a liftgate system having a powered actuator for opening and closing the liftgate. Activation of the powered liftgate can typically be done remotely by pressing a corresponding button on a key fob, on an interior panel in the passenger compartment, or on the liftgate itself, for example.

The liftgate and its mounting components are configured to provide an opening height that is sufficient to facilitate loading and unloading of cargo while providing enough space to allow a user to walk beneath the opened liftgate without hitting their head. The maximum opening height is constrained to go no higher than necessary so that protection from rain or snow incursion into the vehicle is maintained. Since not all potential users of a liftgate are of equal height, the maximum opening height may be undesirable for some users. For powered closing of the liftgate, a "close" button is typically installed on an interior edge of the liftgate, and this may be hard to reach for some users with the liftgate at the maximum opening height. Consequently, powered actuation systems have become available which have the capability to adjust the opening height of the liftgate to a height less than the maximum opening height. However, users are often not aware of this capability so that it goes unused.

A typical procedure for setting an opening height involves pressing the liftgate close button one or more times during an opening operation when the liftgate reaches the desired height. Once the custom setting is made, the liftgate uses the customized height until a special procedure is performed to adjust or deactivate it. When a different person uses the liftgate, the custom setting may be mismatched to that person's height. Moreover, changes in the height of the ground behind the vehicle may result in the customized height being a mismatch for the person for whom the customized setting was made.

SUMMARY OF THE INVENTION

The present invention provides automatic determinations of a desired liftgate opening height at the time that an opening command is received. Where multiple possible users are detected behind the vehicle, an optimal opening height is selected based on the heights and proximity of the possible users. User detection is performed with existing sensors, and efficient and reliable control operation is provided. Moreover, automatic closing of the liftgate can be provided after a period of inactivity.

In one aspect of the invention, a vehicle includes a liftgate system with a vertically-opening liftgate and a power actuator responsive to a user opening command for opening the liftgate to a variable opening height. An active sensor is adapted to detect objects and respective distances to objects within a detection zone. A camera adapted to capture a search image with a field-of-view showing objects in the detection zone. In response to the user opening command, a controller 1) performs facial recognition on the search image to detect image locations containing a face of each respective person visible in the search image, 2) identifies distances for each respective person according to coincidence with the detected objects, 3) determines a user height according to the respective image location and distance of at least one respective person visible in the search image, and 4) sets the variable opening height in response to the user height.

BRIEF DESCRIPTION OF THE DRAWINGS

FIG. 6 is a flowchart showing one preferred method of the invention for setting an opening height for a liftgate.

DETAILED DESCRIPTION OF PREFERRED EMBODIMENTS

Figure 1:
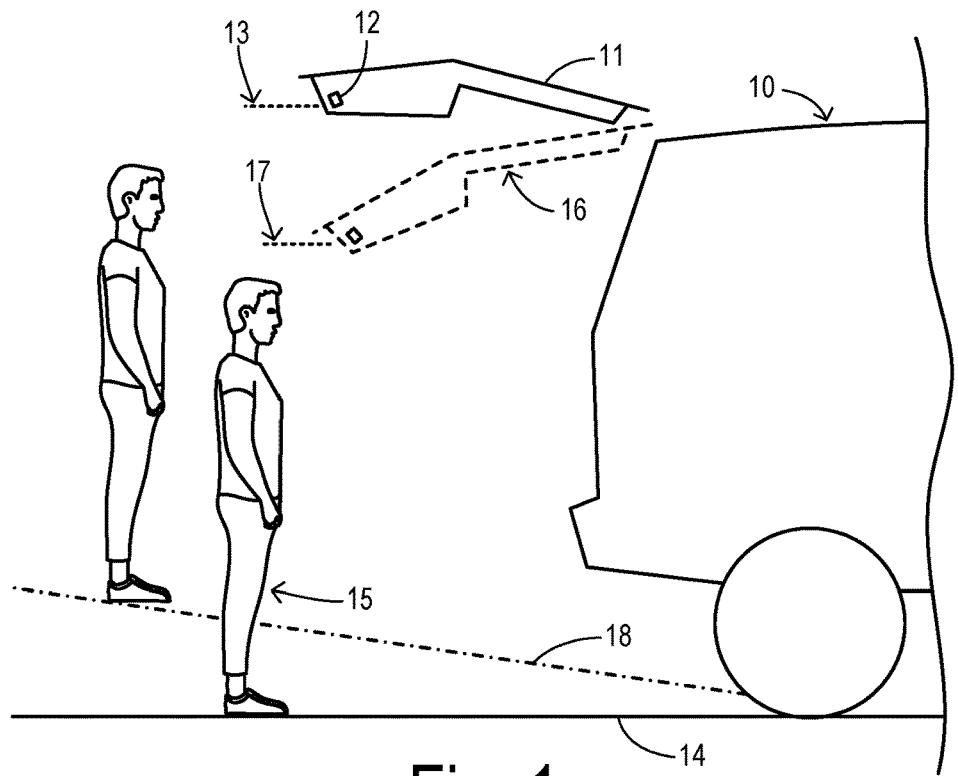
FIG. 1 is a diagram showing a variable liftgate opening height.

Referring to FIG. 1, a vehicle 10 has a liftgate 11 with a close button 12 on an interior edge (e.g., near a door latch of liftgate 11). Liftgate 11 is shown in solid lines at a maximum opening height 13 above a horizontal ground level 14. A person or user 15 may have a height such that it may be difficult to reach close button 12 with liftgate 11 at maximum height 13. Therefore, an actuator system capable of providing a variable opening height can be used to achieve a reduced opening height for liftgate 11 as shown in dashed lines at a liftgate position 16 so that the close button is placed at a height 17 above horizontal ground level 14. In some prior art systems, the variable opening height can be manually set and then used every time that a powered opening of liftgate 11 occurs. However, prior art systems have not been adaptive, so that the opening height may be inappropriate for other users and can even provide a mismatch for user 15 when there is an uneven ground level 18 having a slope or rise which results in user 15 being elevated with respect to the opening liftgate height.

Figure 2:
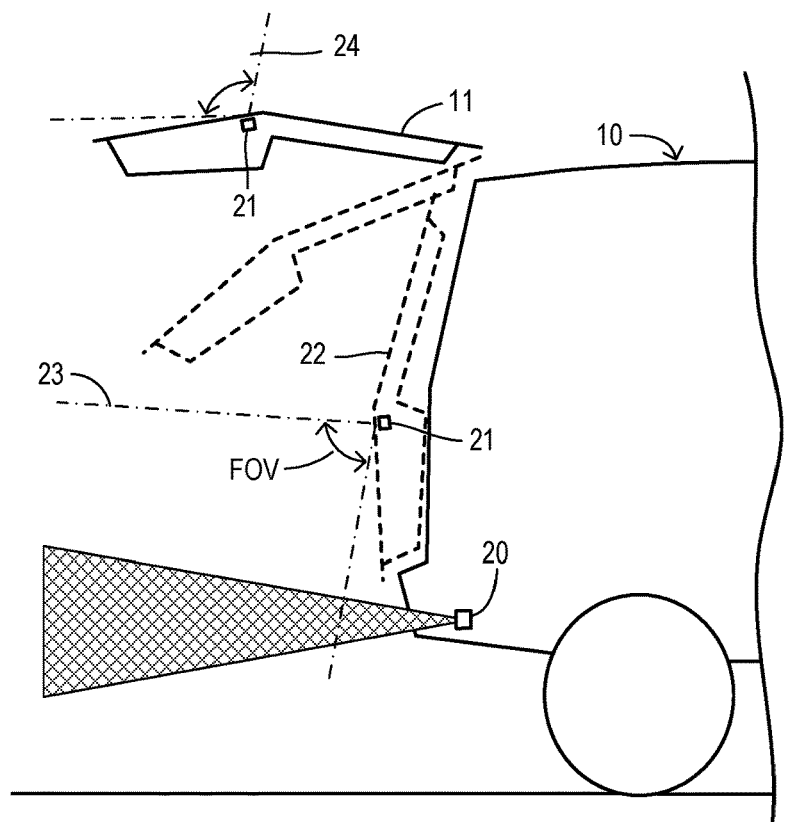
FIG. 2 is a diagram showing data gathering components associated with a rear liftgate.

In order to provide an automatic system for adaptively controlling the variable opening height, the invention uses both an apparent elevation of a user behind the vehicle and a separation distance between the vehicle and the detected user. As shown in FIG. 2, vehicle 10 includes an active sensor system 20 performing object detection. Sensor system 20 may preferably be comprised of an array of ultrasonic sensors which is commonly employed on vehicles as a backup aid for detecting crossing traffic and other object while backing up the vehicle. In order to differentiate between persons and other objects, a backup camera system 21 (typically mounted near the center of liftgate 11) is used to capture a search image revealing the scene behind the vehicle. When liftgate 11 is in a closed state as shown at 22, camera 21 provides a field-of-view 23 which is optimized for a backup driving function and therefore would not include the full height of people in the area. By the time that liftgate 11 is fully opened as shown in solid lines, a field-of-view 24 is likewise not appropriately positioned to detect the people behind the vehicle 10.

Figure 3:
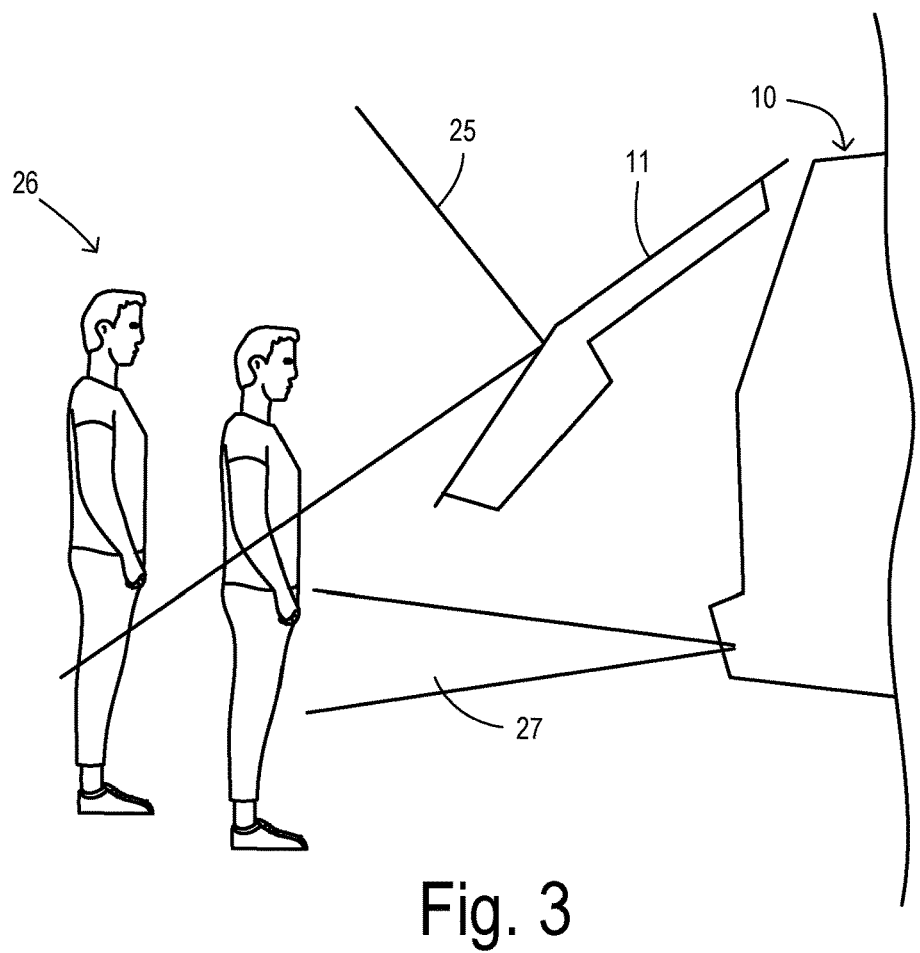
FIG. 3 is a diagram showing image capture and ultrasonic detection of people in the vicinity of an opening rear liftgate.

As shown in FIG. 3, liftgate 11 has an optimum opening position which places the backup camper camera at a predetermined to capture height where a field-of-view 25 is optimally placed to see the faces of a group of persons 26. Active sensor system 20 may have an ultrasonic interrogation field 27 such that the active object detection and visual inspections provide an overlapping detection zone behind the vehicle through which a person desiring to access a cargo area of vehicle 10 passes. Using facial recognition in the captured search image to determine an apparent elevation of a face, and combining the apparent elevation with the corresponding distance obtained with the active sensor, the invention can determine actual heights of persons visible in the search image relative to the vehicle as explained in greater detail below.

Figure 4:
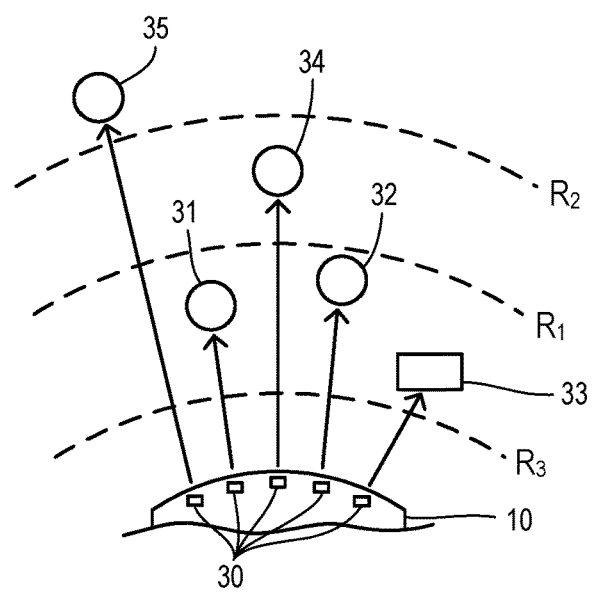
FIG. 4 is a top view of an area divided into various zones behind a rear end of a vehicle having active sensing of object in the zones.

FIG. 4 is a top view showing a back end of vehicle 10 having a sensor array 30 for detecting objects in a detection zone behind vehicle 10. Sensor array 30 may include individual ultrasonic sensors or can include Radar or Lidar sensors. Each sensor within array 30 may have separate beam patterns covering separate radial sectors within the overall detection zone in order to separately distinguish different objects (depending on the active sensing technology being used).

A person engaged in using the opened liftgate for depositing or removing cargo would typically be located within a predetermined distance of the vehicle shown as a distance $R_1$ (e.g., about 8 feet). Objects within radial distance $R_1$ are considered to be within a near region and objects farther away that $R_1$ in a far region. The far region may have a cutoff radius $R_2$ from vehicle 10 which may be defined according to a maximum range of the sensor array or may correspond to a predetermined distance beyond which objects are to be ignored (e.g., 12 feet). A radius $R_3$ is also shown which may be used in connection with automatic closing of the lift gate as explained later.

In FIG. 4, sensor array 30 detects objects 31, 32, and 33 within the near region (between vehicle 10 and radius $R_1$). An object 34 is present within the far region between radius $R_1$ and radius $R_2$, while an object 35 is outside the detection zone (i.e., farther than radius $R_3$). Detected objects may tracked as either moving or fixed, and only those objects corresponding to a person need to be considered in initiating the automatic opening of the liftgate. In this example, objects 31, 32, and 34 correspond to persons within the detection zone and object 33 represents a fixed object.

Figure 5:
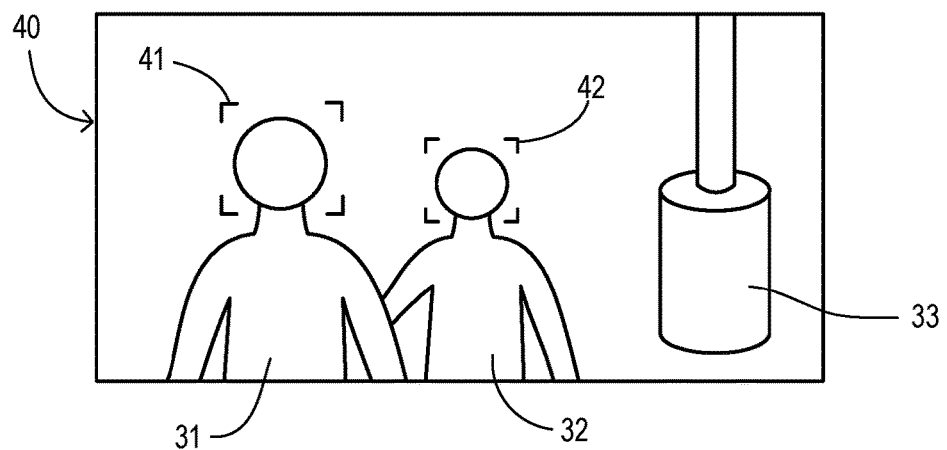
FIG. 5 is a search image captured by a vehicle camera including faces detectable using facial recognition.

FIG. 5 shows a captured search image 40 with a field-of-view overlapping the detection zone of the active sensor array such that persons 31 and 32 and fixed object 33 are seen. Well-known image processing techniques and software perform facial recognition on the search image to detect image locations containing faces, such as faces 41 and 42. Based on coincidence of a radial sector (or other object tracking information from different types of active sensors) of a detected object with a person visible in the search image (as identified by facial recognition, a controller (e.g., in a liftgate control module) determines a user height for each person based on a distance derived by the active object-detection sensors and an apparent height of a person based on the elevation of the corresponding face. If there is more than one potential user, then the invention looks for a tallest person in determining the opening height since it would be desirable to allow the tallest person to easily move about under the opened liftgate. When at least one person is at a distance that places them in the near region, then the tallest person in the near region is used to determine the opening height. If no persons are in the near region, then a tallest person in the far region may be used.

In order to economize on computing resources, a lookup table is preferably used which correlates an apparent elevation of a face within the search image with an opening height based on the respective object distance obtained from the active sensors. The opening heights stored in the lookup table may take into account the actual user height plus an offset representing a nominal reaching distance (arm length) and other offsets such as to take into account the wearing of a hat.

A preferred method of the invention is shown in FIG. 6 wherein a lift gate open command is received in step 45. The open command could be initiated by a user by pressing a button on a key fob or by pressing a pushbutton within the passenger cabin, for example. In response to the command, the liftgate begins to open under control of the liftgate actuator. The actuator system may have an electric motor drive with a clutch that enables the opening of the liftgate to be halted at any desired position. The drive includes a position sensor in order to continuously monitor the opening height of the liftgate.

In step 46, a check is performed to determine whether any objects are being detected within the detection zone of the active sensors. As the liftgate rises during opening in step 47, the search image is captured in a predetermined field of view. When the camera being used is mounted on the liftgate itself, then the predetermined field of view occurs when the liftgate is at a predetermined capture height. In step 48, the search image is processed using known facial recognition methods/software for detecting faces (e.g., using algorithms of the type used in digital cameras). For each detected face, a reference point is determined (e.g., representing the top of the head) which specifies the apparent height of the face and the horizontal position. In step 49, the face locations (i.e., reference points) and corresponding distance data from the active object detection sensors are used to determine a tallest user. Initially, a comparison is conducted using only faces in the near region (e.g., within 8 feet of the liftgate opening). If no users are detected in the near region, then the comparison is extended to the far region, which handles the situation where an approaching user triggered the opening of the liftgate using a wireless key fob from a greater distance.

In step 50, a check is performed to determine whether there was a successful detection of at least one face for which there was matching distance data from the active sensors resulting in a determination for the tallest user. If successful, then the tallest height is used in step 51 to determine a liftgate opening height. The foregoing steps occur quickly enough that the newly determined opening height is available for stopping the ongoing motion of the liftgate at the set height. The determined opening height is also stored in memory in order to make the most recent historical value available for use as a default value when the liftgate is opened at a later time without a person being detected.

If detection fails in either step 46 or step 50, then the method proceeds to step 52 wherein a default opening height is applied for stopping the liftgate. The default opening height can be comprised of the last value stored in the history or can be a different default value such as a customized opening height previously set by the user.

Figure 7:
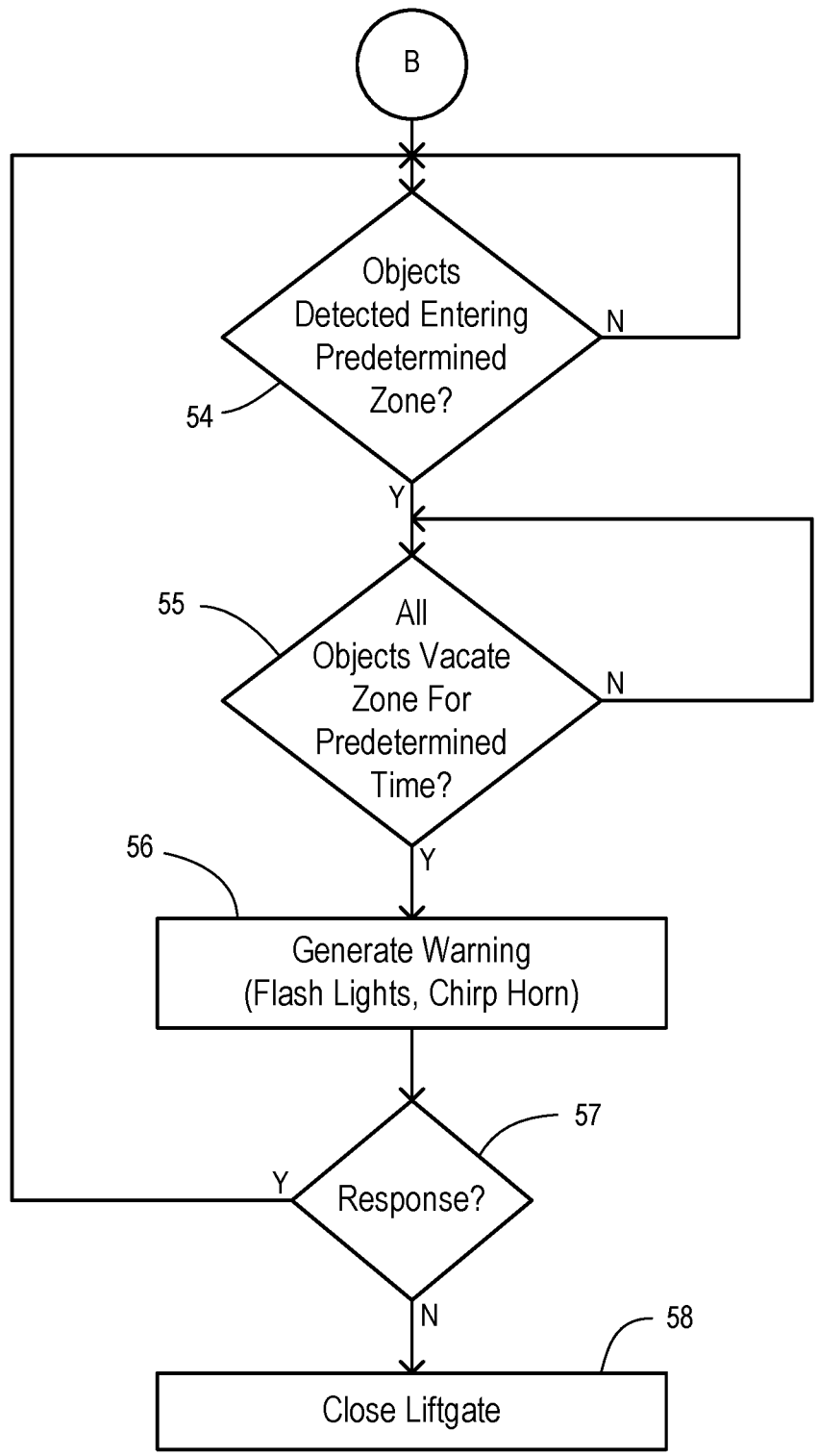
FIG. 7 is a flowchart showing one preferred method for automatic closing of a liftgate.

Once the liftgate has been stopped according to its variable opening height (either a newly detected height or a default height), the invention can optionally monitor user activity and automatically close the liftgate. After steps 51 or 52 in FIG. 6, the method can proceed via a point B to a flowchart in FIG. 7 in order to reclose the liftgate after the users move away. Thus, a check is performed in step 54 to determine whether one or more moving objects are detected within or entering a predetermined zone. The predetermined zone extends by a predetermined distance from the liftgate opening (such as radial distance $R_3$ in FIG. 4) which may be about 4 feet in a preferred embodiment. If at least one moving object is detected, then step 55 tracks the moving objects to determine whether all moving objects vacate the predetermined zone for a predetermined time (e.g., about 10 seconds) sufficiently long to indicate that the persons are done loading/unloading. If the predetermined zone is vacated for the predetermined time, then an automatic closing operation is attempted. First, a warning is generated in step 56 by flashing vehicle exterior lights and chirping the horn. Then a check is performed in step 57 for a user response that may cancel the automatic closing operation. For example, the user could press a liftgate control button on the vehicle or key fob or can be given an additional amount of time to return to the predetermined zone. If a response is detected then the method returns to step 54, otherwise the liftgate is closed in step 58.

Figure 8:
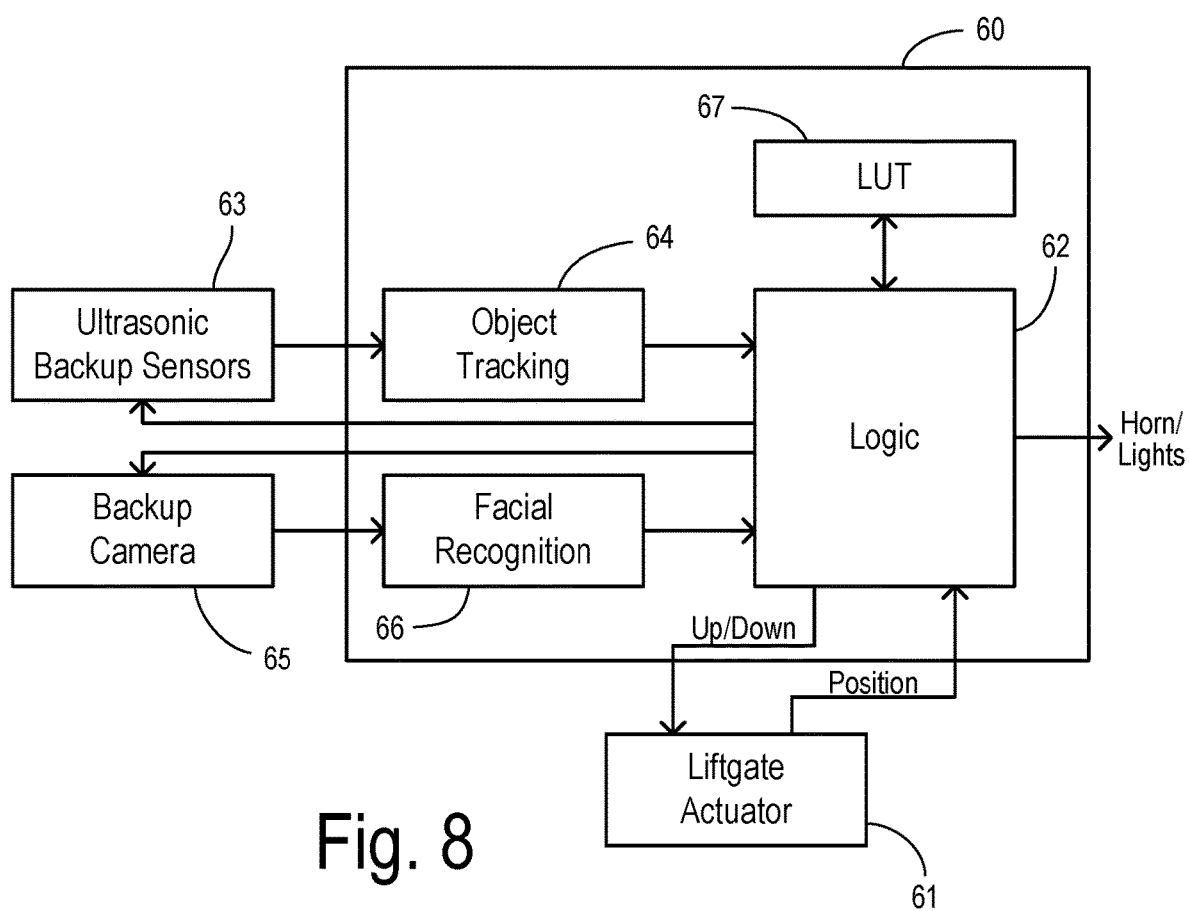
FIG. 8 is a block diagram showing vehicle apparatus according to one preferred embodiment.

FIG. 8 shows one preferred apparatus of the invention for providing the enhanced functionality of the invention using hardware components that are typically already available on a vehicle. Thus, a liftgate control module 60 is coupled with a liftgate actuator 61. A logic block 62 in control module 60 receives position signals from liftgate actuator 61 and sends opening and closing commands to actuator 61. An array of ultrasonic backup sensors 63 is connected to module 60 and responds to control signals from logic block 62 to provide active sensor signals to an object tracking block 64. Tracked object positions and distances are provided from object tracking block 64 to logic block 62.

A backup camera 65 responds to activation signals from logic block 62 in order to provide a captured search image to a facial recognition block 66. Face locations (reference points) are provided from facial recognition block 66 to logic block 62.

Logic block 62 may be comprised of a microcontroller with programming which is configured to correlate face locations with corresponding tracked objects and to use the correlations to determine user heights, select a tallest height, and to set the variable opening height as explained above. A lookup table (LUT) 67 coupled with logic block 62 may include a mapping function that is indexed according to each facial elevation and object distance. The output values of the mapping function are based on premeasured correlations between facial elevation in a search image with object distance, and may further include a nominal reaching height added to the height values and other offsets so that each element of LUT 67 provides the actual liftgate opening height to be used.

Logic block 62 is also programmed according to the automatic closing operation as described above, and it is coupled to other control modules in the vehicle in order to transmit commands for activating the vehicle horn and external lights in order to provide warning signals as discussed above.

What is claimed is:

1. Vehicle apparatus comprising:
   a liftgate system with a vertically-opening liftgate and a power actuator responsive to a user opening command for opening the liftgate to a variable opening height;
   an active sensor adapted to detect objects and respective distances to objects within a detection zone behind the vehicle apparatus;
   a camera adapted to capture a search image with a field-of-view showing objects in the detection zone; and
   a controller coupled to the liftgate system, active sensor, and camera, wherein in response to the user opening command the controller 1) performs facial recognition on the search image to detect image locations containing a face of each respective person visible in the search image, 2) identifies distances for each respective person according to coincidence with the detected objects, 3) determines a user height according to the respective image location and distance of at least one respective person visible in the search image, and 4) sets the variable opening height in response to the user height.

2. The apparatus of claim 1 wherein the controller 5) compares a plurality of user heights determined according to a plurality of respective image locations and distances of a plurality of respective persons visible in the search image, and wherein the controller sets the variable opening height using a tallest one of the user heights.

3. The apparatus of claim 1 wherein the camera is mounted on the liftgate, and wherein the search image is captured during opening of the liftgate when the liftgate is at a predetermined capture height.

4. The apparatus of claim 1 wherein the active sensor is comprised of an array of ultrasonic sensors.

5. The apparatus of claim 1 wherein whenever the controller fails to identify any person in the search image corresponding to the detected objects then the variable opening height is set to a default opening height.

6. The apparatus of claim 5 wherein the controller stores the set opening height as the default opening height whenever the controller sets the variable opening height in response to identifying a person in the search image.

7. The apparatus of claim 5 wherein the default opening height is manually configured by a user.

8. The apparatus of claim 1 wherein after the liftgate stops at the variable opening height the controller monitors for detected objects moving within a predetermined zone, and if a predetermined time period elapses with the predetermined zone being empty of any detected moving objects then the controller commanding an automatic closing of the liftgate.

9. A method of controlling a liftgate system on a vehicle, wherein the liftgate system has a vertically-opening liftgate and a power actuator responsive to a user opening command for opening the liftgate, wherein the vehicle has an active sensor adapted to detect objects and respective distances to objects within a detection zone behind the vehicle and a camera adapted to capture a search image with a field-of-view showing objects in the detection zone behind the vehicle, the method comprising the steps of:
   receiving a user opening command;
   initiating the power actuator to open the liftgate;

capturing the search image with the camera;
sensing the detected objects with the active sensor;
performing facial recognition on the search image to detect image locations containing a face of each respective person visible in the search image;
identifying distances for each respective person according to coincidence with the detected objects;
determining a user height according to the respective image location and distance of at least one respective person visible in the search image; and
setting a variable opening height in response to the user height so that the opening of the liftgate stops at the variable opening height.

10. The method of claim 9 further comprising the step of:
comparing a plurality of user heights determined according to a plurality of respective image locations and distances of a plurality of respective persons visible in the search image;
wherein the set variable opening height is selected as a tallest one of the user heights.

11. The method of claim 9 wherein the camera is mounted on the liftgate, and wherein the search image is captured during opening of the liftgate when the liftgate is at a predetermined capture height.

12. The method of claim 9 wherein the active sensor is comprised of an array of ultrasonic sensors.

13. The method of claim 9 further comprising the step of setting the variable opening height to a default opening height whenever the facial recognition step fails to identify any person in the search image corresponding to one of the detected objects.

14. The method of claim 13 further comprising the step of:
storing the set opening height corresponding to the determined user height whenever the controller sets the variable opening height in response to identifying a person in the search image.

15. The method of claim 13 wherein the default opening height is manually configured by a user.

16. The method of claim 9 further comprising the steps of:
monitoring for detected objects moving within a predetermined zone after the liftgate stops at the variable opening height; and
if a predetermined time period elapses with the predetermined zone being empty of any detected moving objects then commanding closing of the liftgate.

17. Vehicle apparatus comprising:
a liftgate system with a vertically-opening liftgate and a power actuator responsive to a user opening command for opening the liftgate to a variable opening height;
an active sensor adapted to detect objects and respective distances to objects within a detection zone;
a camera adapted to capture a search image with a field-of-view showing objects in the detection zone; and
a controller coupled to the liftgate system, active sensor, and camera, wherein in response to the user opening command the controller 1) performs facial recognition on the search image to detect image locations containing a face of each respective person visible in the search image, 2) identifies distances for each respective person according to coincidence with the detected objects, 3) determines a user height according to the respective image location and distance of at least one respective person visible in the search image, 4) compares a plurality of user heights determined according to a plurality of respective image locations and distances of a plurality of respective persons visible in the search image, and 5) sets the variable opening height in response to a tallest one of the user heights;
wherein the detection zone has a near region and a far region, and wherein as long as there is at least one respective person within the near region then the comparison of user heights considers only the respective persons determined to be within the near region.

18. A method of controlling a liftgate system on a vehicle, wherein the liftgate system has a vertically-opening liftgate and a power actuator responsive to a user opening command for opening the liftgate, wherein the vehicle has an active sensor adapted to detect objects and respective distances to objects within a detection zone and a camera adapted to capture a search image with a field-of-view showing objects in the detection zone, the method comprising the steps of:
receiving a user opening command;
initiating the power actuator to open the liftgate;
capturing the search image with the camera;
sensing the detected objects with the active sensor;
performing facial recognition on the search image to detect image locations containing a face of each respective person visible in the search image;
identifying distances for each respective person according to coincidence with the detected objects;
comparing a plurality of user heights determined according to a plurality of respective image locations and distances of a plurality of respective persons visible in the search image;
determining a user height according to the respective image location and distance of at least one respective person visible in the search image; and
setting a variable opening height in response to the user height so that the opening of the liftgate stops at the variable opening height, wherein the set variable opening height is selected as a tallest one of the user heights
wherein the detection zone has a near region and a far region, and wherein as long as there is at least one respective person within the near region then the comparison of user heights considers only the respective persons determined to be within the near region.

* * * * *